May 27, 1958 E. H. B. BARTELINK 2,836,657

SECRECY COMMUNICATION SYSTEM

Filed Nov. 20, 1944 4 Sheets-Sheet 1

Inventor:
Everhard H.B.Bartelink,
by Harry E. Dunham
His Attorney.

Inventor:
Everhard H. B. Bartelink,
by Harry E. Dunham
His Attorney.

May 27, 1958 E. H. B. BARTELINK 2,836,657

SECRECY COMMUNICATION SYSTEM

Filed Nov. 20, 1944 4 Sheets-Sheet 3

Inventor:
Everhard H.B. Bartelink,
by Harry E. Dunham
His Attorney.

Inventor:
Everhard H.B. Bartelink,
by Harry E. Dunham
His Attorney.

United States Patent Office 2,836,657

Patented May 27, 1958

2,836,657

SECRECY COMMUNICATION SYSTEM

Everhard H. B. Bartelink, West Milton, N. Y., assignor to General Electric Company, a corporation of New York Application November 20, 1944, Serial No. 564,301

15 Claims. (Cl. 179—1.5)

Figures 1, 2:
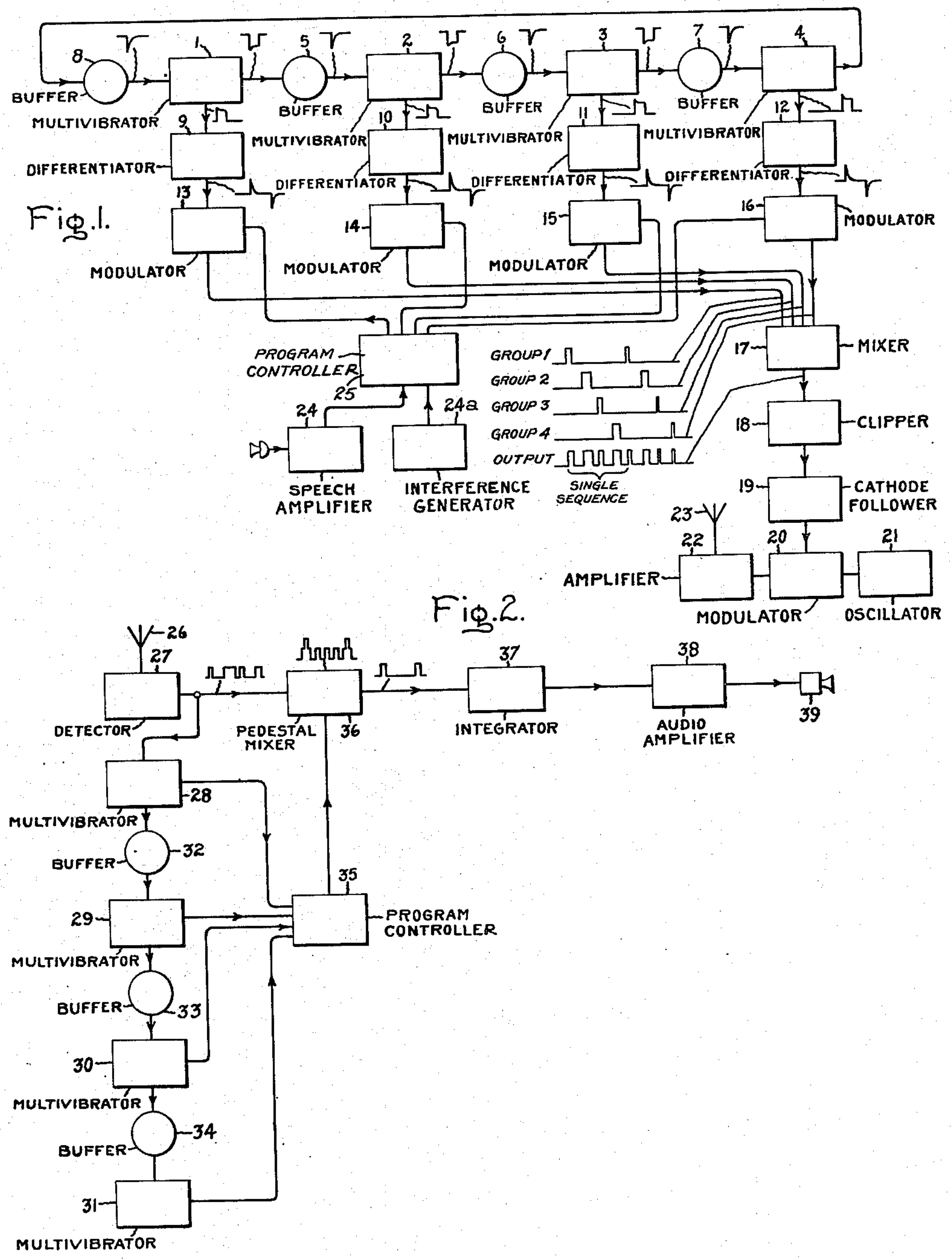

My invention relates to communication systems, and more particularly to systems of secrecy communication wherein a desired signal is effectively masked by undesired signals except in a receiver having special means for separating the desired from the undesired signals.

Systems of secret radio communication are currently known in which signal distortion is effected at the transmitter in accordance with a predetermined pattern. Similar systems are also known wherein the distorting pattern is intermittently changed in a random manner. Such distortion may be accomplished, for example, by displacing all audio frequencies above a predetermined splitting frequency into one band and displacing all audio frequencies below the splitting frequency into another band. Speech inversion may also be used in each of the bands. If desired, decoding may be rendered more difficult by intermittently changing the splitting frequency or changing the amount of the frequency shift above and below this frequency, or both. With such systems, however, decoding may usually be successively accomplished by connecting in parallel circuit relation a plurality of decoding units. By successively cutting out certain of the decoding units, it is usually possible to obtain an at least partially intelligible signal. In accordance with my invention, however, such partial decoding is rendered entirely impossible, so that no intelligible signal may be received, except in a receiver which is synchronized at all times with the transmitter.

It is a general object of my invention to provide a new and improved secrecy system of communication.

It is a further object of my invention to provide a secrecy system of communication in which masking of the signal is carried out by a program selector operating in a completely irregular though predetermined manner thereby to preclude decoding of the message by unauthorized persons.

It is another object of my invention to provide a multichannel secrecy communication system comprising desired and undesired signal waves transmitted in time division multiplex relation.

It is also an object of the present invention to provide means for masking a desired signal in a time division multiplex transmission system by intermittently varying a characteristic of the various transmitting channels.

It is a still further object of my invention to provide a secrecy system of radio communication comprising a plurality of transmitting channels and a program selector for intermittently transferring a desired message from one channel to another while placing unintelligible noise or spurious messages on the remaining channels.

It is a more specific object of my invention to provide a time division multiplex pulse communication system having a plurality of transmitting channels and means for intermittently transferring a desired message between channels in an irregular manner while placing an unintelligible or spurious message on the remaining channels so that the desired message is intelligible only to a receiver synchronized with the transmitter.

It is still another object of my invention to provide a new and novel speech interference generator arranged to render completely unintelligible any speech which may be received along with the interference.

Briefly, my invention comprises a time division multiplex pulse transmitter having a plurality of pulse generators operable at substantially the same frequency or repetition rate. The pulse generators are synchronized in series or cascade relation, so that the various groups of recurrent pulses constituting the various audio channels are displaced in time phase relation. The receiver is provided with a plurality of pulse generators synchronized with the transmitter pulse generators and operable at the same repetition rate. The receiver pulse generators control a pedestal injector arranged to select any one group of the plurality of groups of transmitted pulses and supply the selected group of pulses to a demodulator. In order effectively to mask the signal from all receivers except one synchronized with and using the same coding sequence as the transmitter, switching means are provided for intermittently transferring the desired signal between the various pulse groups or channels of the transmitter in an irregular though predetermined sequence controlled by a program selector. A second program controller synchronized with that at the transmitter is associated with the receiver continually to maintain the receiver instantaneously responsive to that channel of the transmitter upon which the desired signal momentarily appears. For the purpose of further masking the signal, the transmitter is arranged to maintain, upon those channels not carrying the desired signal, a variety of unintelligible interference signals. I have discovered that those interference signals are most effective which contain, as one element thereof, a distorted arrangement of the desired signal. The signal may be further masked by intermittently varying a characteristic of the pulse groups, such as number of pulse groups in a sequence, phase position or repetition rate.

Figure 3:
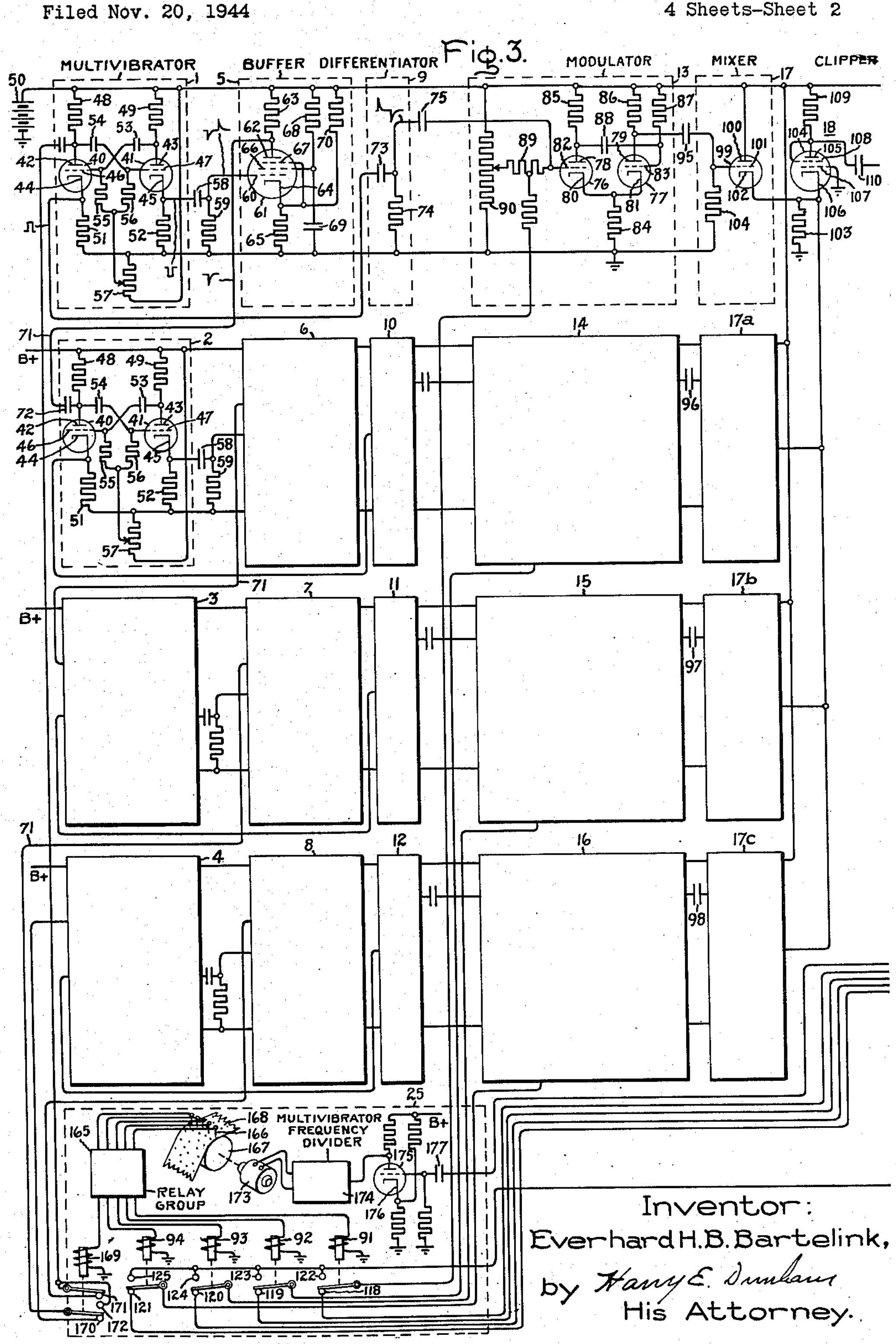
Figure 3A:
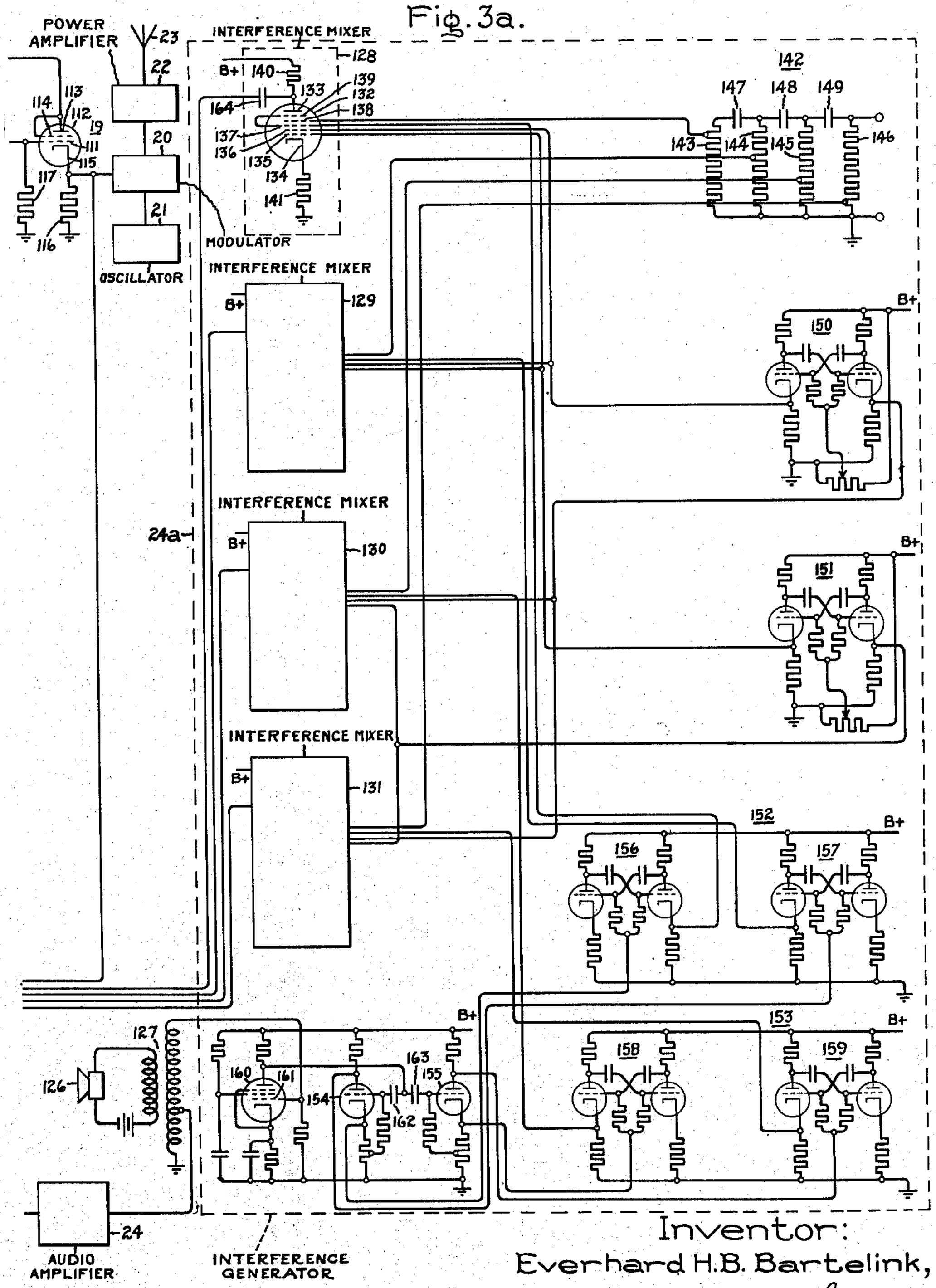
Figure 4:
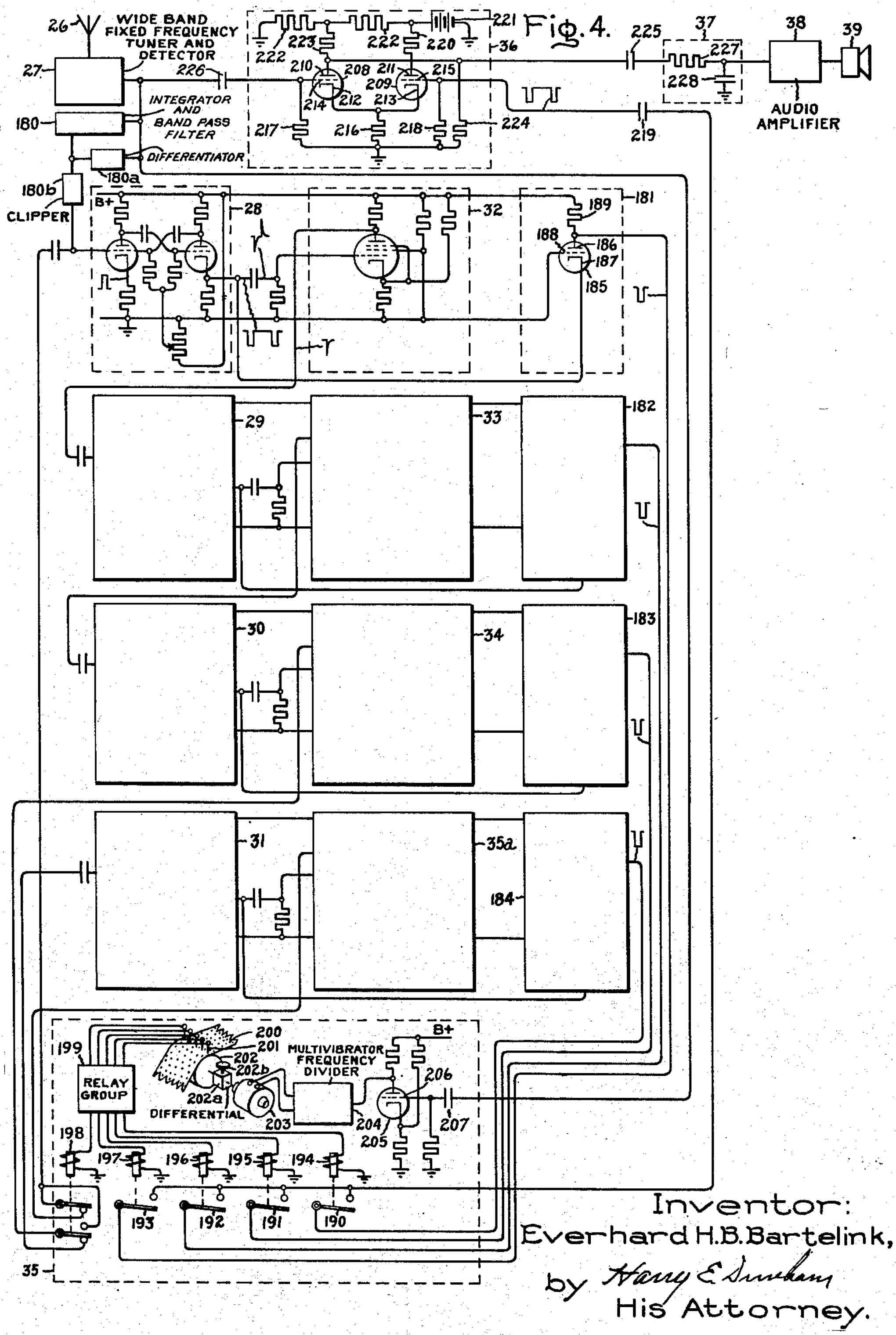

My invention will be more fully understood and its various objects and advantages further appreciated by referring now to the following detailed specification taken in conjunction with the accompanying drawings in which Figs. 1 and 2 are diagrammatic representations in block form of a transmitter and a receiver, respectively, embodying my invention; Figs. 3 and 3*a* taken together is a schematic circuit diagram of the transmitter shown at Fig. 1; and Fig. 4 is a schematic circuit diagram of the receiver shown at Fig. 2.

At Fig. 1, there is illustrated a system for transmitting four groups of modulated pulses on the same carrier frequency in time division multiplex relation. The system comprises a plurality of generators of substantially rectangular pulses, such as multivibrators 1, 2, 3, and 4 arranged in cascade with buffer stages 5, 6, 7, and 8 therebetween so that each multivibrator triggers the next multivibrator through the connecting buffer stage. With this arrangement pulses are developed in a definite sequence while preventing reverse triggering operation of the multivibrators. At the end of the sequence the first multivibrator is again triggered and the sequence repeated. From each multivibrator there is derived a positive pulse having a width relative to the full pulse cycle of the multivibrator equal to the reciprocal of the number of multivibrators in the sequence. In other words, with four multivibrators, as shown, the width of any positive pulse is one-fourth the full multivibrator pulse cycle.

In the form of the invention shown, each multivibrator triggers the next in cascade relation with multivibrator 4 triggering multivibrator 1. The free running frequency of each of the multivibrators is approximately the same. It will be appreciated, of course, that if desired the multivibrator 1 may be triggered from a separate source of synchronizing pulses, rather than utilizing the multivibrator 4 to synchronize the first multivibrator.

Positive pulses from the multivibrators 1, 2, 3, and 4 are supplied through differentiators 9, 10, 11, and 12, respectively, to signal modulators 13, 14, 15, and 16, respectively. The various modulators 13–16, inclusive, may suitably modulate their respective groups of pulses in width, amplitude, frequency, or phase. The pulses from all the modulators 13–16, inclusive, are supplied to a mixer 17 at the output of which appear all the groups of pulses in displaced time-phase relation. The mixing step is graphically illustrated on the pulse diagram associated with Fig. 1 at the output of the mixer 17. The interspersed groups of pulses from the mixer 17 are passed through a clipper 18 and a cathode follower 19 to a carrier wave modulator 20. Carrier waves are supplied to the modulator 20 from a master oscillator 21. The modulated carrier wave from the modulator 20 is supplied through an amplifier 22 to an antenna 23.

The groups of pulses supplied to the modulators 13, 14, 15, and 16 may be modulated either in accordance with a desired signal from a speech amplifier 24 or in accordance with an interference signal from an interference generator 24a. The speech amplifier 24 and the interference generator 24a are arranged for alternative connection to each of the modulators 13–16, inclusive, through a suitable program controller 25, the interference generator 24a being at all times connected to all those modulators except that one to which the speech amplifier 24 is momentarily connected. The program controller 25 includes switching means and a program selector for intermittently transferring the desired speech from the amplifier 24 from one to another of the modulators 13–16, inclusive, in a predetermined irregular manner.

A suitable receiver is shown at Fig. 2. Such a receiver comprises an antenna 26 connected to a detector 27 for removing the carrier frequency component of the transmitted pulse energy. The interspersed groups of pulses emanating from the detector 27 are supplied to a series of multivibrators 28, 29, 30, and 31 connected in cascade through buffer stages 32, 33, 34, and 35a. The multivibrators 28, 29, 30, and 31 each have substantially the same repetition rate as the multivibrators 1, 2, 3, and 4 of the transmitter and multivibrator 28 is also to be synchronized with that group of pulses generated in multivibrator 1 of the transmitter. The multivibrators 28, 29, 30, and 31 are arranged for selectable connection through a suitable program controller 35 to a pedestal mixer 36 which is connected also to the output of the detector 27. Thus, by selecting a proper one of the multivibrators 28–31, inclusive, for connection to the pedestal mixer, any desired one of the interspersed groups of pulses supplied to the pedestal mixer by the detector 27 may be raised in amplitude with respect to the other groups of pulses. The output of the pedestal mixer 36 is supplied through an integrator 37 to an audio amplifier 38 and then to a loud speaker or other signal reproducing device 39. In operation, the program controller 35 at the receiver is maintained in synchronism with the program controller 25 of the transmitter so that, as the desired signal is transferred between various transmitter channels, a corresponding one of the multivibrators 28–31 at the receiver is selected for connection to the pedestal mixer 36. The receiver multivibrators are maintained in synchronism with the transmitter multivibrators by a suitable marker pulse at the beginning of each sequence. Accordingly, the receiver selects for demodulation only that modulated group of transmitted pulses which momentarily carries the desired signal.

A time division multiplex pulse communication system incorporating some of the features of the transmitter and receiver described above is described and claimed in my copending patent application Serial No. 690,864, filed August 16, 1946 (now Patent 2,471,138, issued May 24, 1949), which is in turn a continuation-in-part of my abandoned application, Serial No. 477,496, filed March 1, 1943, and assigned to the same assignee as the instant application.

*The transmitter*

At Figs. 3 and 3*a* I have shown a more detailed schematic circuit diagram of the transmitter illustrated at Fig. 1 wherein like parts have been assigned reference numerals corresponding to those at Fig. 1. Figs. 3 and 3*a* comprise Sheets 2 and 3 of the drawing, respectively, and the complete transmitter diagram is formed by placing the sheets side by side in alignment, with the right side of Sheet 2 adjacent the left side of Sheet 3. In the particular embodiment of the invention shown at Figs. 3 and 3*a* each multivibrator 1, 2, 3, and 4 is of the positive bias type and comprises a pair of electron discharge devices 40 and 41 having anodes 42 and 43, cathodes 44 and 45, and control electrodes 46 and 47, respectively. The anodes 42 and 43 are connected through anode resistors 48 and 49, respectively, to a suitable source of unidirectional positive potential, such as a battery 50. The cathodes 44 and 45 are connected to ground through a pair of cathode resistors 51 and 52, respectively. The control electrode 46 is connected to the anode 43 through a capacitor 53 and the control electrode 47 is connected to the anode 42 through a capacitor 54. The control electrodes 46 and 47 are also connected through bias resistors 55 and 56, respectively, and a common bias potentiometer 57 to ground. Multivibrators of this type are in themselves conventional, and it is well known to those skilled in the art that the grid circuit contacts and the bias derived from potentiometer 57 control the free-running frequency or repetition rate of the multivibrator. By way of example a suitable repetition rate for the multivibrators 1–4 may be of the order of ten kilocycles per second.

It is also well known that the action of a multivibrator, such as that shown at 1 in Fig. 3, is periodically to produce across the resistances 48, 49, 51, and 52 pulses of substantially rectangular wave shape. The ratio of the lengths of the pulses on the two cathode resistors of each of the multivibrators depends upon time constants of the multivibrator grid circuits. In the particular instance illustrated herein by way of example, these time constants are so chosen that the ratio of the length of a positive pulse across the cathode resistor 51 to the length of a positive pulse across the cathode resistor 52 is equal to the reciprocal of the number of multivibrators included in the transmitter; that is, in the example shown in the drawings, the period of each positive pulse across the cathode resistor 51 is 25 percent of the full cycle time of the multivibrator. It will be understood that a positive pulse appears across any cathode resistor, for example, the resistor 51 when the tube associated with that resistor is conducting. For the period of the positive pulse across one cathode resistor, the voltage across the other cathode resistor is substantially zero because the tube associated therewith is non-conductive. Thus, the other cathode resistor, as the resistor 52, may be regarded as exhibiting a negative pulse during the period of the positive pulse on the resistor 51. That is, pulses of equal duration and opposite phase may be regarded as appearing upon the separate cathode resistors.

For the purpose of synchronizing multivibrator 2 with multivibrator 1 so that the trailing edge of each pulse from multivibrator 1 initiates a pulse in multivibrator 2, the negative 25-percent pulses appearing across the resistor 52 are supplied through a differentiating circuit comprising a condenser 58 and a resistor 59 to a control electrode 60 of an electron discharge device 61 in the buffer stage 5. The electron discharge device 61 includes also an anode 62 connected to the positive terminal of the battery 50 through a resistor 63, a cathode 64 connected to ground through a resistor 65, a screen grid 66, and a suppressor grid 67. The suppressor grid 67 is connected directly to the cathode in a well-known manner and the screen grid 66 is connected to the positive terminal of the battery 50 through a biasing resistor 68 and to ground through a high frequency by-pass condenser 69. The cathode 64 is normally biased sufficiently positive to maintain the discharge device 61 nonconductive. For this purpose, the cathode 64 is connected to the positive terminal of the battery 50 through a resistor 70. The resistors 65 and 70 form a potentiometer across a portion of which is connected the discharge device 61. Since the control electrode 60 is normally negative with respect to the cathode 64 by reason of its connection to ground through the resistor 59, the discharge device 61 is normally non-conductive.

The negative pulses from the resistor 52 of the multivibrator 1 appear at the output of the differentiator 58, 59 as very short duration negative and positive pulses at the leading and trailing edges, respectively, of each pulse from the resistor 52. Since the control electrode 60 is normally negative with respect to the cathode 64, the electron discharge device 61 is responsive only to the positive peaks of the differentiated pulses. These short-duration positive pulses represent the trailing edges of the 25 percent pulses from the resistor 52, and render the discharge device 61 conductive for a brief interval at the termination of each 25 percent pulse from the multivibrator 1. When the discharge device 61 becomes conductive, the potential of its anode decreases, so that a short negative pulse appears on a lead 71 connected between the anode 62 and a coupling condenser 72 connected to the anode 42 of the discharge device 40 in the multivibrator 2. Thus, it will be seen that at the trailing edge of each negative pulse across the resistor 52 of multivibrator 1, a negative synchronizing pulse is applied to the anode 42 of the multivibrator 2. The trailing edge of the negative pulse across the resistance 52 of multivibrator 1 occurs simultaneously with the trailing edge of the positive pulse across the resistance 51 of multivibrator 1, so that at the trailing edge of each positive pulse from multivibrator 1 a synchronizing pulse is applied to multivibrator 2. This negative synchronizing pulse is applied through the condenser 54 to the discharge device 41 of multivibrator 2, amplified in the device 41, and applied through the condenser 53 of multivibrator 2 to the control electrode 46 of this multivibrator. The negative synchronizing pulse thus terminates the discharge of the discharge device 41 in multivibrator 2 and thereby initiates discharge of the discharge device 40 in multivibrator 2. It will thus be seen that termination of the discharge in discharge device 40 of multivibrator 1 initiates discharge of the corresponding discharge device 40 of multivibrator 2, so that the positive pulses appearing across the resistances 51 of the various multivibrators occur in sequential time relation.

In a manner similar to that described above, negative pulses derived from the resistors 52 of each of the multivibrators 2, 3, and 4 are supplied through buffer stages 6, 7, and 8, respectively, to synchronize each succeeding multivibrator, the multivibrator 4 providing a synchronizing pulse for multivibrator 1. It will of course be understood by those skilled in the art that, if desired, the buffer stage 8 and the synchronizing connection from multivibrator 4 to multivibrator 1 may be omitted, and a synchronizing voltage from an external source applied to the multivibrator 1.

Positive pulses derived from the cathode resistor 51 and corresponding in time with the negative pulses across the cathode resistor 52 of multivibrator 1 are supplied through the differentiator 9 to the modulator 13. The differentiator 9 comprises a capacitor 73 and a resistor 74, and the differentiated output is connected through a coupling capacitor 75 to the modulator 13. As is well understood by those skilled in the art, the output of the differentiator 9 comprises a very short duration positive pulse at the leading edge of the rectangular pulse across the resistor 51 and a very short duration negative pulse at the trailing edge of the rectangular pulse.

The modulator 13 comprises a multivibrator of the delay type which is triggered by the leading edge of the rectangular pulse across the multivibrator resistor 51 through the differentiator 9 and provides a substantially rectangular pulse having a width or duration proportional to a signal bias potential impressed upon the grid of one of the multivibrator tubes. I wish to have it understood, however, that my invention is not limited to a width modulating multivibrator, but that any suitable means may be employed to modulate the transmitted pulses in width, amplitude or in frequency or phase of the carrier.

More specifically, the delay multivibrator comprises a pair of electron discharge devices 76 and 77 having anodes 78 and 79, cathodes 80 and 81, and control electrodes 82 and 83, respectively. The cathodes 80 and 81 are connected together and to ground through a common cathode resistor 84, and the anodes 78 and 79 are connected to the positive terminal of the battery 50 through resistors 85 and 86, respectively. The control electrode 83 is positively biased from the positive terminal of the battery 50 by connection thereto through a resistor 87, and is coupled to the anode 78 through a coupling capacitor 88. The control electrode 82 is connected through a resistor 89 through a biasing potentiometer 90 and through the coupling capacitor 75 to the differentiator 9 as a source of synchronizing pulses. An intermediate point on the grid bias resistor 89 is selectably connected by means of a relay 91 either to the output of the interference generator 24*a* or to the output of the audio amplifier 24. In either case the signal source, whether it be the source of desired signals or the source of interference signals, act as a source of bias potential for the control electrode 82 varying in intensity at signal frequency.

To understand the operation of the delay multivibrator comprising the discharge devices 76 and 77, let it be assumed that the discharge device 77 is carrying current and that the discharge device 76 is non-conductive. Under these conditions, the cathode 80 is biased positively by the amount of the voltage drop through the cathode resistor 84. Let it also be assumed that the positive grid bias potential derived from the potentiometer 90 is less than the positive potential of the cathode 80 and that no signal bias is impressed upon the resistor 89 through the relay 91. Conduction through the discharge device 77 alone continues until disturbed by a positive synchronizing pulse from the coupling condenser 75. When such a synchronizing pulse arrives, the control electrode 82 is suddenly driven positive with respect to the cathode 80, so that current flows in the discharge device 76. As soon as current flows in the device 76, the potential of its anode 78 decreases suddenly and impresses a negative potential upon the control electrode 83 of the discharge device 77 through the coupling condenser 88. The negative potential thus impressed upon the control electrode 83 renders the discharge device 77 non-conductive. The constants of the circuit through the discharge device 76 are so chosen that the voltage drop through the common cathode resistor 84, when the device 76 is conducting is smaller than when the device 77 is conducting so that the cathode 80 remains negative with respect to the control electrode 82 after passing of the synchronizing pulse. Thus, the device 76 continues to conduct, while the negative charge upon the condenser 88 leaks off through the resistors 87 and 85. As soon as the potential of the control electrode 83 is raised by discharge of the condenser 88 to such a point that the potential difference between the control electrode 83 and the cathode 81 is slightly less than the cutoff potential, the discharge device 77 again begins to conduct. As soon as the device 77 carries current, the voltage drop through the resistor 84 is so increased that the cathode 80 of the discharge device 76 is driven positive with respect to the control electrode 82, thereby to cut off the discharge of the discharge device 76.

It will be understood from the foregoing explanation that the cycle time of the delay multivibrator 13 is the same as that of the multivibrator 1 since its operation is controlled by the synchronizing pulses derived from the multivibrator 1 at the rate of one synchronizing pulse per cycle. Also, the period for which the discharge device 76 conducts following the arrival of each synchronizing pulse through the coupling condenser 75 is determined by the length of time taken for the condenser 88 to discharge sufficiently to raise the grid potential of the device 77 above cutoff. This time is determined, not only by the constants of the discharge circuit 88, 87, 85, but also by the extent to which the discharge device 77 is driven beyond cutoff by conduction of the discharge device 76. The intensity of the negative bias on the discharge device 77 is determined largely by the voltage drop through the cathode resistor 84 when the discharge device 76 is conducting. This voltage drop is in turn determined by the intesity of currents traversing the discharge device 76, as determined by the bias potential of its control electrode. Thus, it will be seen that the width or duration of a positive pulse derived from the anode 79 of the discharge device 77 is proportional to the bias potential applied to the control electrode 82 of the discharge device 77. As described hereinbefore, this bias potential is determined both by the setting of the potentiometer 90 and also by the signal potential applied to the resistor 89.

Thus, it is evident that the width of pulses derived from the anode 79 of the discharge device 77 is proportional to the signal potential derived selectively either from the audio amplifier 24 or the interference generator *24a*, and that these signal modulated pulses are initiated simultaneously with the initiation of pulses across the cathode resistor 51 of the multivibrator 1 by reason of the synchronizing pulses derived through the differentiator 9. Preferably, the normal unmodulated width of the pulses derived from the resistor 86 with no signal voltage present is less than $1/n$ times the total cycle time, where $n$ is the number of pulse channels or groups in a sequence. Preferably, this width is approximately $1/2n$. With four pulse channels as shown, the unmodulated width of the pulses from the modulators 13–16 may suitably be about 10 percent of the total cycle time. Such 10 percent pulses may be modulated in width from 5 percent to 15 percent of the cycle time by the desired signal, and from 0 percent to 25 percent by the interference signal.

The width modulators 14, 15, and 16 function in a manner entirely similar to that of the modulator 13 described above. Thus, it will be evident that four separate groups of pulses modulated in width in accordance with impressed signals appear at the output terminals of the modulators 13, 14, 15, and 16. Each group of modulated pulses is synchronized with the group of pulses derived from the associated multivibrator 1, 2, 3, or 4, so that the width modulated pulses appear in displaced time-phase relation and at a repetition rate determined by the multivibrators 1, 2, 3, and 4. Signal modulation from either the audio amplifier 24 or the interference generator *24a* is selectively applied to the modulators 14, 15, and 16 through relays 92, 93, and 94, respectively.

The modulated pulse outputs of the modulators 13, 14, 15, and 16 are applied through coupling condensers 95, 96, 97, and 98 to the mixers 17, *17a*, *17b*, and *17c*, respectively. Each mixer comprises an electron discharge device 99 having an anode 100, a control electrode 101, and a cathode 102. The anodes 100 are connected together and directly to the positive terminal of the battery 50, and the cathodes 102 are connected together and through a common cathode resistor 103 to ground. The control electrodes 101 are connected through grid bias resistors 104 to ground. Thus, the modulated pulse outputs of the modulators 13, 14, 15, and 16 appear upon the common cathode resistor 103. It will be understood that the pulses superposed on the resistor 103 do not interfere with each other, but are interspersed in time division multiplex relation by reason of the cascade arrangement of the multivibators 1, 2, 3, and 4.

The pulses appearing across the resistor 103 are limited to a common predetermined amplitude in the clipper stage 18. The clipper comprises an electron discharge device 104 having an anode 105, a cathode 106, a control electrode 107, and a screen grid 108. The anode 105 is connected through a resistor 109 to the positive terminal of the battery 50, and the control electrode 107 is grounded. The cathode 106 is grounded through the mixer resistor 103, and the screen grid 108 is biased positively by connection directly to the anode 105. Thus, because of the zero bias of the grid 107 and the positive bias of the grid 108, the discharge device 104 is normally conductive in the absence of any pulses across the resistor 103. When pulses appear across the cathode resistor 103, the cathode 106 is rendered positive with respect to the grid 107, thereby to cutoff the discharge device 104 for the period of each pulse. Since the intensity of current carried by the discharge device 104 between pulses is independent of the amplitude of the pulses, it will be evident that negative pulses appearing at the anode 105 have an intensity independent of the intensity of the pulses across the cathode resistor 103 and periods equal to the periods of the cathode pulses.

The negative width modulated pulses of constant intensity and modulated width appearing at the resistor 105 are supplied through a coupling condenser 110 to a control electrode 111 of the cathode follower 19. The cathode follower 19 comprises an electron discharge device 112 having in addition to the control electrode 111 an anode 113, a screen electrode 114, and a cathode 115. The anode 113 is directly connected to the positive terminal of the battery 50, and the screen electrode 114 is biased positively to render the discharge device 112 normally conductive by direct connection to the anode 113. The cathode 115 is grounded through a cathode resistor 116 and the control electrode 111 is grounded through a grid bias resistor 117. Thus, the discharge device 112 conducts in the absence of pulses at the coupling condenser 110. When negative pulses are supplied through the coupling condenser 110, the discharge device 112 is cut off for the period of the pulses, thereby to produce negative pulses of modulated width and predetermined constant intensity across the cathode resistor 116. These negative pulses are supplied to the carrier wave modulator 20. A carrier wave to be modulated is generated in the oscillator 21 and supplied to the modulator 20. The modulated carrier wave is fed through a power amplifier 22 to an antenna 23.

The means for supplying signal modulation to the pulse modulators 13, 15, and 16 will now be described in greater detail. These pulse modulators are all connected through normally closed contacts 118, 119, 120, and 121 of the program selector relays 91, 92, 93, and 94, respectively, to the interference generator *24a* and may be individually connected through normally open contacts 122, 123, 124, and 125 of the relays 91, 92, 93, and 94 to the audio amplifier 24. Desired signals are impressed upon the audio amplifier 24 from a microphone 126 through an audio coupling transformer 127. The manner in which the selector relays 91, 92, 93, and 94 are controlled will be described in greater detail hereinafter.

*The interference generator*

Referring now to the interference generator *24a*, it will be observed that this generator comprises a plurality of interference mixers 128, 129, 130, and 131. Each interference mixer includes an electron discharge device 132 having an anode 133, a cathode 134, and a plurality of control electrodes 135, 136, 137, 138, and 139. The anodes 133 are connected to a source of positive unidirectional potential indicated upon the drawing as B+ through resistors 140, and the cathodes 134 are grounded through resistors 141. The control electrodes 135–139, inclusive, are supplied with a variety of interference signals from separate sources.

One such source of interference modulation comprises a phase shifter 142 connected to a source of 60-cycle alternating current and including a plurality of resistors 143, 144, 145, and 146 and capacitors 147, 148, and 149. From the phase shifter 142, 60-cycle voltages in displaced phase relation are supplied to the control electrodes 138 of the mixers 128–131, inclusive.

A second source of interference modulation is shown as comprising a low frequency multivibrator 150. The multivibrator 150 is similar to the multivibrators 1, 2, 3, and 4 previously described, except that the circuit constants thereof are so fixed that the multivibrator 150 has a free running frequency of the order of 5 to 50 cycles per second. Pulses appearing across one cathode resistor of the multivibrator 150 are supplied to the control electrodes 136 of the interference mixers 128 and 129, while pulses of opposite phase appearing across the other cathode resistor of the multivibrator 150 are supplied to the control electrodes 136 of the interference mixers 130 and 131.

Similarly, a third source of interference modulation is shown comprising a multivibrator 151 similar in all respects to the multivibrator 150, except that the circuit constants are so arranged that the multivibrator 151 has a free running frequency of the order of 200–1000 cycles per second. The pulses appearing across one cathode resistor of the multivibrator 151 are supplied to the control electrodes 135 of the interference mixers 128 and 129, while pulses of opposite phase appearing across the other cathode resistor of the multivibrator 151 are supplied to the control electrodes 135 of the interference mixers 130 and 131.

I have found that, in order most effectively to mask a desired signal with an interference signal or noise, it is necessary that a certain amount of the desired signal be present in distorted form in the interference or noise signals. For this purpose, I provide two sources of interference modulation 152 and 153 arranged to supply distorted audio signals to the interference mixers 128–131, inclusive. Each interference source 152 and 153 comprises a pair of multivibrators each similar to the multivibrators 1, 2, 3, and 4, except that their grid bias potentials are determined in accordance with the desired signals from the microphone 26, rather than by an adjustable potentiometer. The time constants of the multivibrators included in the sources 152 and 153 are preferably so fixed that the multivibrators have a high repetition rate in the audio spectrum. Grid bias potentials for the multivibrators of the sources 152 and 153 are supplied from a pair of parallel connected amplifying discharge devices 154 and 155, respectively. It will be understood that the grid bias potentials supplied to the various multivibrators control their repetition rates. The source 152 comprises a multivibrator 156 and a multivibrator 157, while the source 153 comprises a multivibrator 158 and a multivibrator 159.

Signal voltage is supplied to the discharge devices 154 and 155 through an audio amplifier 160 having a control electrode 161 connected to the output of the audio transformer 127. The anode voltage of the audio amplifier 160 is supplied through a pair of coupling condensers 162 and 163 to the control electrodes of the discharge device 154 and 155, respectively. The discharge devices 154 and 155 are connected in parallel circuit relation between a source of unidirectional positive potential indicated by B+ and ground through a pair of anode resistors and a pair of cathode resistors. Thus, audio voltage appears across both the anode and the cathode resistor of both amplifiers 154 and 155. The audio voltage across each cathode resistor is in opposite phase with respect to the audio voltage across the associated anode resistor.

To control the frequencies or repetition rates of the multivibrators 156 and 157 in accordance with the desired signal, the anode of the discharge device 154 is connected to the grid bias circuit of the multivibrator 157 and the cathode of the discharge device 154 is connected to the grid bias circuit of the multivibrator 156. Similarly, the anode of the discharge device 155 is connected to the grid bias circuit of the multivibrator 159 and the cathode of the discharge device 155 is connected to the grid bias circuit of the multivibrator 158. Thus, any variation in signal intensity causes the repetition rates of the multivibrators 156 and 157 to vary in opposite senses and likewise causes the repetition rates of the multivibrators 158 and 159 to vary in opposite senses at signal frequency. Therefore, each interference source 152 and 153 provides two groups of pulses varying oppositely in frequency in accordance with the intensity of the signal. These sources are coupled to the interference mixers 128–131, inclusive, by connecting one cathode resistor of the multivibrator 156 to the control electrode 137 of the interference mixer 128 and connecting the opposite cathode resistor of the multivibrator 157 to the control electrode 137 of the interference mixer 129. The interference source 153 is differently connected in that similar cathode resistors of the multivibrators 158 and 159 are connected to the control electrodes 137 of the interference mixers 130 and 131, respectively.

Thus, each interference mixer 128–131, inclusive, contains in its output a composite signal including a component derived from each of the interference sources 142, 150, 151, and 152 or 153. While components from each interference source are included in the output of each mixer, the outputs of the mixers are different by reason of the fact that the interference sources are differently connected to the control electrodes of the various mixers as described above. The anodes of the interference mixers 128–131, inclusive, are connected through coupling condensers 164 to the normally closed contacts 118, 119, 120, and 121, respectively, of the selector relays 91–94, inclusive.

It will be noted that each selector relay 91–94, inclusive, normally connects the interference generator **24*a* to one of the modulators 13–16, inclusive. If any one of the relays 91–94 is energized, that relay connects the audio amplifier 24 to the associated pulse modulator, while the remaining relays leave the interference generator connected to the remaining pulse modulators. The selector relays 91–94, inclusive, are energized through a group of control relays 165 in an order determined by a plurality of contact fingers 166, a conducting drum 167, and an irregularly punched insulating tape 168**. Thus, the desired signal is intermittently transferred in an irregular manner from one selected pulse transmitter to another, while the interference signal is left on the remaining non-selected pulse transmitters. The tape controlled contactor is preferably of the type used in mechanical transmission of "start-stop" five unit code "teleprinter" signals.

In order more completely to mask the signal, I have shown a fifth program selector relay 169 connected to control the synchronizing circuits between the multivibrators 1, 2, 3, and 4 so that, when desired, the multivibrator 4 may be cut out and only three pulse transmitters connected in the cascade relation hereinbefore described. For the purpose of so reducing the available number of pulse transmitting channels, the lead 71 from the buffer 7 is connected to the multivibrator 4 through a normally closed contact 170 of the selector relay 169, and the lead 71 from the buffer 8 is connected to the multivibrator 1 through a normally closed contact 171 of the relay 169. When the relay 169 is energized, it opens the contacts 170 and 171 and closes a normally open contact 172 to connect the buffer 7 directly to the multivibrator 1, thereby to disable the multivibrator 4 and the corresponding audio channel in the cascaded chain of pulse transmitters. As stated hereinbefore, the synchronizing connection from the last to the first multivibrators may, if desired, be omitted by omitting the relay contacts 171 and 172.

As previously mentioned, the insulating tape 168 is punched in a predetermined manner to determine the sequence in which the relays 91–94, inclusive, and 169 pick up and drop out. It is contemplated that the tape 168 shall be replaceable and that tapes punched in any desired manner shall be easily applied to the rollers 167. Preferably, the tape 168 is punched in such a manner that the order in which the relays 91–94, inclusive, and 169 are energized is entirely irregular, that is, the order of relay energization follows no regular pattern. The order of energization is, however, predetermined in that it corresponds to the punchings upon the tape 168. This can be done by typing identical messages into a telegraph tape perforator at the transmitting and receiving stations.

The roller 167 is driven by a synchronous motor 173 supplied with alternating current from any suitable source of alternating current at fixed or controllable frequency. Such a source is here shown as a multivibrator frequency divider 174 synchronized with the pulse output of the transmitter, as at the point where pulses are supplied to the modulator 20. By way of example, I have shown an electron discharge device 175 connected as an amplifier with its control electrode 176 coupled through a condenser 177 to the output of the cathode follower 19. The output of the discharge device 177 is supplied to the multivibrator frequency divider 174. It will be evident that this output consists of pulses having $n$ times the repetition rate of the pulses of any one of the multivibrators 1, 2, 3, or 4, where $n$ represents the number of multivibrators connected in cascade. The multivibrator frequency divider comprises a plurality of multivibrators connected in cascade relation with the output of each multivibrator synchronizing the following multivibrator. The first multivibrator of the chain is synchronized by the pulse output of the discharge device 175. It will be understood by those skilled in the art that, by suitably selecting the time constants of the multivibrators in the multivibrator frequency divider 174, the pulse frequency of the multivibrators may be reduced in passing from one stage to the next by rendering each succeeding multivibrator responsive to only one of each $r$ synchronizing pulses from the preceding multivibrator, where $r$ is the frequency reduction ratio between stages. Thus, the frequency of the current supplied to the motor 173 and the speed of the motor are definitely determined by the frequency of repetition rate of the radiated pulses from the antenna 23. As an alternative a tuning fork or other constant frequency source may be used to control the motor 173.

*The receiver*

Referring now to the receiver shown at Fig. 4, this receiver comprises a plurality of multivibrators 28, 29, 30, and 31 similar to the multivibrators 1, 2, 3, and 4 of the transmitter and having substantially the same free running repetition rate as the multivibrators 1, 2, 3, and 4. Negative 25 percent pulses appearing across one cathode resistor of each multivibrator 28, 29, 30, and 31 are passed through a differentiating circuit to buffer stages 32, 33, 34, and 35*a*, respectively. From each buffer stage a negative synchronizing pulse is supplied to the next succeeding multivibrator in a manner analogous to that described in connection with Fig. 3. If desired, of course, the synchronizing connection from multivibrator 31 to multivibrator 28 may be omitted.

The first multivibrator 28 is also synchronized by pulses received at the antenna 26. For this purpose, the composite series of received pulses is passed through a wide band fixed frequency tuner and detector 27, and from the detector 27 through an integrator and band pass filter 180 and a differentiator 180*a* in parallel to a clipper 180*b*. Triggering pulses from the clipper 180*b* are supplied to a suitable discharge device of the multivibrator 28. If it is assumed that all four multivibrators of the transmitter are in operation, the received pulses appear at the grid of the multi-vibrator 28 at four times the natural frequency of the multivibrator 28. Thus, the multivibrator 28 will synchronize with every fourth pulse received. It is desirable to insure that the multivibrator 28 synchronizes only with the pulse group originating at the multivibrator 1 of the transmitter. To accomplish such synchronization, the pulses from the first channel of the transmitter may be provided with a distinguishing characteristic to which the multivibrator 28 is responsive, for example, pulses in one selected group, as from the multivibrator 1, may be given greater amplitude or greater unmodulated width than pulses in the other groups.

By way of illustration of the operation of the integrator and filter 180 in synchronizing the receiver with the transmitter, let it be assumed that the unmodulated pulses in the group from the modulator 13 are made of greater duration than those of the other groups by suitable proportioning of the discharge resistors 85 and 87 in modulator 13. The output of the integrator in the device 180 then contains a voltage component at the frequency of the combined pulses supplied to its input and another component at the fundamental frequency of the selected single pulse group. The band pass filter is arranged to pass only the fundamental component and to have the proper phase shift, and thus the output of the device 180 is a wave of generally sinusoidal form synchronized in phase and frequency with the selected incoming pulse group. Upon this sine wave are superposed the differentiated pulses from the differentiator 180*a*. The differentiated pulses of the selected group appear at the peak of the fundamental frequency wave, with the leading edge of each pulse in the selected group appearing as a very short positive pulse at the peak of the fundamental. Therefore, after suitable clipping in the device 180*b*, the multivibrator 28 will be triggered by only the leading edge of each pulse in one selected group, as the group from multivibrator 1 in the transmitter. When this condition obtains, the multivibrator 28 will be synchronized with the multivibrator 1 and the multivibrators 29, 30, and 31 will be synchronized with the multivibrators 2, 3, and 4, respectively.

It will be understood, of course, that if desired the devices 180, 180*a*, and 180*b* may be omitted and the output of the detector 27 connected directly to trigger the multivibrator 28. In this event synchronization must be accomplished by switching the receiver on and off a number of times until the multivibrator 28 by chance locks itself in with the pulse group from multivibrator 1.

Positive 75 percent pulses from suitable cathode resistors of the multivibrators 28–31, inclusive, are supplied to limiters 181, 182, 183, and 184, respectively. It will of course be understood that in specifying 75 percent pulses, I am referring to the four channel system shown by way of illustration, and that my invention is not limited to any particular number of channels. In general, the ratio of the length of the positive pulses supplied to the limiters 181–184 to the full cycle time of the multivibrators 28–31 is $$\frac{n-1}{n}$$

when $n$ is the number of channels employed. Each limiter includes an electron discharge device 185 having an anode 186, a cathode 187, and a control electrode 188. The control electrodes 188 are connected directly to ground, and the anodes 186 are connected through anode resistors 189 to the positive terminal of a suitable source of unidirectional voltage supply indicated on the drawing at B+. The cathodes 187 are connected to the negative pulse sources in the associated multivibrator 28, 29, 30, or 31. Since the 75 percent positive pulses are identical with the 25 percent negative pulses, the source of 75 percent positive multivibrator pulses may, for example, be the same cathode resistor from which the 25 percent negative synchronizing pulses are derived. In operation, each limiting discharge device 185 is normally conductive because of the absence of any bias upon its control electrode 188. With the cathode 187 connected to that cathode resistor of the associated multivibrator whereon 25 percent negative pulses appear, the cathode 187 effectively receives 75 percent positive pulses. Whenever such a positive pulse is received, the cathode 187 is driven positive with respect to the control electrode 188 for the period of the pulse, and conduction through the discharge device 185 ceases for such period. Thus, negative 25 percent pulses of a predetermined limited amplitude appear at the anodes 186 of the limiting discharge devices 185. These anodes are connected to normally open contacts 190, 191, 192, and 193, respectively, of a plurality of selector relays 194, 195, 196, and 197 in the controller 35.

The program controller 35 of the receiver includes also an additional selector relay 198 connected in the synchronizing circuits between the multivibrators 30 and 31 and the multivibrators 31 and 28 in the same manner as the selector relay 169 of Fig. 3. The purpose of the relay 198 in the receiver is to cut out multivibrator 31 of the receiver whenever multivibrator 4 of the transmitter is cut out. The manner in which this switching is accomplished will be evident from the drawing. It will of course be understood that, if desired, the relay 198 may be modified to omit the synchronizing connection from the last multivibrator in a sequence to the multivibrator 28, as suggested hereinbefore with respect to the transmitter relay 169.

The selector relays 194–198, inclusive, are energized through a group of control relays 199 similar to the control relay group 165 of the transmitter and under the control of a traveling insulating tape 200 similar to the tape 168 of the transmitter. The tape 200 contains punchings identical with the punchings of the tape 168 and controls contact between a plurality of brushes 201 and an electrically conducting driving drum 202.

The drum 202 is connected through an adjustable differential gear device 202*a* to a synchronous motor 203. The motor 203 is energized from a suitable source of alternating current supply, such as a multivibrator frequency divider 204 having an output frequency at all times identical with the output frequency of the multivibrator frequency divider 174 of the transmitter. The multivibrator frequency divider 204 is synchronized with the transmitted pulses through an amplifying discharge device 205 having its control electrode 206 connected through a coupling capacitor 207 with the output of the detector 27.

The adjustable differential 202*a* is provided with a control knob 202*b* arranged momentarily to increase or decrease the speed of the drum 202 with respect to the motor 203, depending upon the direction in which the knob is moved. When the knob is in a fixed position, the differential maintains the ratio of motor speed to drum speed constant, and preferably at unity. The differential 202*a* is used to bring the receiver tape into exact synchronism with the transmitter tape in a manner to be described more fully hereinafter.

It will of course be understood that, if the motor 173 in the transmitter is controlled by a constant frequency tuning fork, the receiver motor 203 may be controlled by a fork of the same frequency.

The relays 194–197, inclusive, function selectively to connect the pulse outputs of the limiters 181–184, inclusive, to the pedestal injector 36. The pedestal injector 36 comprises a pair of electron discharge devices 208 and 209 having anodes 210 and 211, cathodes 212 and 213, and control electrodes 214 and 215, respectively. The cathodes 212 and 213 are connected together and to ground through a common cathode resistor 216. The control electrodes 214 and 215 are connected to ground through grid biasing resistors 217 and 218, respectively, and the control electrode 215 is connected through a coupling condenser 219 to a common contact terminal of the program relays 194–197, inclusive. The anode 211 of the discharge device 209 is connected through a resistor 220 to the positive terminal of a source of unidirectional potential supply, such as battery 221. A potentiometer 222 is connected across the battery 221 and the anode 210 of the discharge device 208 is connected to an intermediate point of the potentiometer 222 through a resistor 223. The anode 210 is also connected to ground through a resistor 224 and to the integrating device 37 through a coupling capacitor 225. Received pulses from the detector 27 are supplied to the control electrode 214 of the discharge device 208 through a coupling capacitor 226.

In operation, the electron discharge device 209 of the pedestal injector 36 is normally conductive. Current passing through the discharge device 209 and the cathode resistor 216 biases the cathode 212 of the discharge device 208 positively so that the grid potential of the device 208, which remains negative in respect to the cathode, maintains the device 208 non-conductive. This negative grid bias is sufficiently great that the received positive pulses impressed upon the grid 214 are insufficient in intensity to render the discharge device 208 conductive. However, whenever a negative pulse is received from one of the multivibrators 28–31, inclusive, through the program relays 194–197, inclusive, and the coupling capacitor 219 upon the grid 215 of the discharge device 209, the discharge device 209 is rendered non-conductive for the period of the pulse. It will be recalled that the period of the pedestal pulses thus received is determined by the multivibrators 28–31, inclusive, and is equal to $1/n$ times the complete pulse cycle, where $n$ is the number of multivibrator channels, or ¼ the pulse cycle in a four channel system. When the discharge device 209 becomes non-conductive, the cathode 212 of the discharge device 208 drops to ground potential, thereby decreasing the negative bias upon the discharge device 208 to such an extent that any signal pulse received through the coupling condenser 226 during the period of the pedestal pulse impressed through the condenser 219, is able to render the discharge device 208 conductive. Thus, it will be evident that the discharge device 208 is rendered conductive only by a selected single group of the superposed groups of signal pulses appearing at the condenser 226, the select group being determined in accordance with the multivibrator 28, 29, 30, or 31 selected for interjection of the pedestal pulse.

In practice it will be found desirable to delay the leading edge of the signal pulses slightly with respect to the leading edge of the pedestal pulses.

The selected signal pulses appearing at the anode 210 of the discharge device 208 are supplied through the coupling capacitor 225 to the integrating circuit 37 to the exclusion of all other signal pulses. The integrating circuit 37 comprises a resistor 227 and a capacitor 228 connected between the coupling capacitor 225 and ground. The voltage appearing across the integrating capacitor 228 is supplied to the audio amplifier 38 and, hence, to a loudspeaker or other signal reproducing device 39. It will be understood that the integrating device 37 functions to convert the width modulation of the impressed rectangular signal pulses into amplitude variations by reason of the slow rise of voltage across the capacitor 228 in response to the imposition of a substantially rectangular pulse.

The signal frequency amplitude variations appearing across the condenser 228 are amplified in the amplifier 38 and supplied to the loudspeaker or other signal reproducing device 39.

*Operation*

By way of summary, it will now be understood from the foregoing detailed description that, in operation, identically punched tapes 168 and 200 are mounted in the transmitter and receiver, respectively, and the motors 173 and 203 set in operation. It is of course necessary that the tapes be synchronized. To accomplish this, the operators at the receiver and transmitter may first speak over a single selected channel without switching between channels. By agreement, the tapes are then begun at approximately the same time. The first portion of each tape will be punched to begin irregular switching operation immediately. If, now, a constant frequency audible note is impressed on the transmitter, it will be heard at the receiver only if the tapes are synchronized. If the receiver operator does not hear the note, he will adjust the differential gear mechanism 202*a* until the note comes through clearly without the interference from the other channels. When the operator at the receiver hears the synchronizing note he knows that the tapes are in synchronism so that secrecy communication can be begun.

In using the apparatus for secrecy communication, a desired signal, such as a spoken message or the like, is impressed upon the transmitter through the microphone 126, while interference signals are supplied from ths interference generator 24*a*. The tapes 168 and 200 are so punched that only one of the program relays 91–94, inclusive, and a corresponding one of the program relays 194–197, inclusive, is energized at any instant. The channel eliminating relays 169 and 198 are energized intermittently and simultaneously independently of the other program relays. In this way the program selector 25 of the transmitter intermittently transfers the desired signal modulations from one to another of the various groups of pulses generated in the four audio channels of the transmitter, while the program controller 35 of the receiver continuously maintains the receiver in synchronism with the transmitter by impressing upon the pedestal injector 36 a pulse in proper phase to select the desired signal modulated group of pulses for demodulation. Furthermore, the program controller 25 of the transmitter maintains interference signals at all times upon non-selected audio channels of the transmitter. The receiver, however, remains non-responsive to these interference signals.

If tuning forks are used to control the motors 173 and 203, the receiver tape may gradually slip with respect to the transmitter tape. This will be detected by decreasing clarity of the signal, and may easily be corrected by slight manipulation of the differential gear unit 202*a*.

From the foregoing explanation, it will be clear that, since the tapes 168 and 200 are punched in an entirely irregular although identical manner, it is impossible to receive the desired signal on any receiver other than one provided with a properly punched tape. The interference signals are so predominant that, if all the received pulses are demodulated without the aid of a pedestal injector or like pulse group selector, or if any one group of pulses alone is demodulated without attempting synchronously to follow the transfer of the desired signal between pulse groups, the desired signal will be found utterly unintelligible. It should be noted that preferably switching by the program controllers 25 and 35 occurs several times per second, for example, up to 25 times per second.

While I have described only one embodiment of my invention by way of illustration, many modifications will occur to those skilled in the art, and I, therefore, wish to have it understood that I intend in the appended claims to cover all such modifications as fall within the true spirit and scope of my invention.

What I claim as new and desire to secure by Letters Patent of the United States, is:

1. A secrecy communication system comprising a transmitting station including a plurality of pulse generators synchronized to produce a plurality of groups of pulses in time division multiplex relation, means for modulating a selected one of said pulse groups in accordance with a desired signal, program selector means for intermittently transferring said desired signal modulation from one to another selected pulse group, additional program selector means recurrently disabling at least one of said pulse generators in a predetermined irregular sequence and thereby changing the number of pulse generators in operation, and a receiving station including means synchronized with said program selector means for continuously maintaining said receiving station responsive to only said selected pulse group.

2. A secrecy communication system comprising a transmitting station including a plurality of pulse generators synchronized to produce a plurality of groups of pulses in time division multiplex relation, means for modulating a selected one of said pulse groups in accordance with a desired signal, a receiving station, means for rendering said receiving station responsive to any selected one of said pulse groups comprising a plurality of pulse generators synchronized to produce a plurality of pulse groups equal in number to said transmitted pulse groups, and means for simultaneously and recurrently changing the number of pulse generators in operation at both said transmitting and receiving stations.

3. A secrecy communication system comprising a transmitting station including a plurality of pulse generators synchronized to produce a plurality of groups of pulses in time division multiplex relation, means for modulating a selected one of said pulse groups in accordance with a desired signal, a receiving station, means for rendering said receiving station responsive to any selected one of said pulse groups comprising a pedestal injector, means for controlling said pedestal injector comprising means for generating at said receiving station a plurality of groups of pulses corresponding in number, phase and repetition rate with said transmitted pulses, and means for simultaneously and recurrently disabling corresponding pulse generators at said transmitting and receiving stations.

4. A secrecy communication system comprising a transmitting station including a plurality of pulse generators synchronized to produce a plurality of groups of pulses in time division multiplex relation, means for modulating a selected one of said pulse groups in accordance with a desired signal, means for modulating at least one non-selected pulse group in accordance with an undesired interfering signal, program selector means at said transmitting station for intermittently transferring said desired signal from one to another selected pulse group and recurrently disabling the generator of at least one non-selected pulse group in a predetermined irregular sequence, a receiving station, means for rendering said receiving station instantaneously responsive to only a single pulse group including a plurality of pulse generators synchronized to produce a plurality of pulse groups corresponding in number, phase and repetition rate with said transmitted pulses, and means at said receiving station synchronized with said program selector means continuously to maintain said receiver generated pulses in correspondence with said transmitter generated pulses and to maintain said receiving station non-responsive to all non-selected pulse groups.

5. A secrecy communication system comprising a transmitting station including a plurality of pulse generators synchronized to produce a plurality of groups of pulses in time division multiplex relation, means for modulating a selected one of said pulse groups in accordance with a desired signal, means for modulating non-selected pulse groups in accordance with an undesired interfering signal, program selector means for intermittently transferring said desired signal from one to another selected pulse group and recurrently disabling at least one generator of a non-selected pulse group, a receiving station, means including a pedestal injector for maintaining said receiving station instantaneously responsive to only a single group of transmitted pulses, means for controlling said pedestal injector comprising means at said receiving station for generating a plurality of groups of pulses corresponding in number, phase and repetition rate with said transmitted pulses, and program means at said receiving station synchronized with said program selector means for recurrently disabling said receiver pulse generators in correspondence with said transmitter pulse generators and applying selected receiver generated pulses to said pedestal injector continuously to maintain said receiving station instantaneously responsive to said selected pulse group.

6. A secrecy system of secrecy communication comprising a transmitting station including a plurality of pulse generators having substantially the same repetition rate, each of said pulse generators producing a group of pulses spaced apart in time relation, means utilizing each of said groups of pulses to synchronize the generator of another of said groups in delayed time phase relation, means for modulating a selected one of said groups of pulses in accordance with a desired signal, means for modulating the remaining groups of pulses in accordance with undesired interfering signals, means for intermittently transferring said desired signal modulation from one to another selected group of pulses, and a receiving station including a receiver pulse generator having substantially said predetermined repetition rate, synchronizing means utilizing one of said groups of pulses continuously to synchronize said receiver pulse generator with said selected group of pulses, and means utilizing said receiver pulse generator to render said receiving station non-responsive to all non-selected groups of pulses.

7. In a secrecy system of communication, a first station for transmitting a plurality of groups of pulses in time division multiplex relation, each of said groups of pulses having substantially the same predetermined repetition rate, means for modulating at least one selected group of pulses in accordance with a desired signal, means for successively applying said desired signal modulation to various of said groups of pulses in a predetermined irregular sequence, means for modulating at least one non-selected group of pulses in accordance with an undesired signal, a second station including a receiver pulse generator having substantially said predetermined repetition rate, means utilizing said receiver pulse generator for rendering said second station responsive only to a single group of said pulses, and means for maintaining synchronism between said selected group of signal modulated pulses and said single group of received pulses.

8. In a secrecy communication system, a series of pulse generators synchronized from each other in cascade, each generator producing a group of recurrent pulses interleaved with pulses from the other generators in time division multiplex relation, means for modulating one of said pulse groups with a desired signal, means for transmitting all said pulse groups over a single signal channel, means for switching said desired signal among said pulse groups in a predetermined time sequence, and additional means for intermittently removing at least one of said generators from said series in a second predetermined time sequence.

9. In a secrecy communication system, a series of $n$ multivibrators synchronized from each other in cascade, each multivibrator producing a group of recurrent pulses having durations not exceeding $1/n$th of their pulse period, means for modulating one of said groups with a selected signal and other groups with non-selected signals, means for transmitting said pulse groups in interleaved time division multiplex relation over a single signal channel, means for transposing said signals among pulse groups in a first predetermined irregular sequence, and additional means for intermittently removing at least one of said multivibrators from said series in a second predetermined irregular sequence thereby intermittently to vary the pulse repetition rate.

10. In a secrecy communication system, a transmitting station comprising a first series of pulse generators synchronized from each other in cascade, each generator producing a group of recurrent pulses interleaved with pulses from the other generators in time division multiplex relation, means for modulating one of said pulse groups with a desired signal, means for switching said desired signal among said pulse groups in a predetermined time sequence, and means for transmitting all said pulse groups over a single signal channel, and a receiving station comprising a second corresponding series of pulse generators similarly synchronized from each other in cascade, means for receiving said transmitted pulse groups and utilizing them to synchronize said second series with said first series, a demodulator supplied with said received pulse groups, gating means for rendering said demodulator responsive only to a corresponding pulse group, and means for synchronously switching control of said gating means between generators of said second series in the same predetermined sequence as at said transmitting station.

11. In a secrecy communication system, a transmitting station comprising a first series of $n$ multivibrators synchronized from each other in cascade, each multivibrator producing a group of recurrent pulses having durations not exceeding $1/n$th of their pulse period, means for modulating one of said groups with a selected signal and other groups with non-selected signals, a program controller for transposing said signals among pulse groups in an irregular predetermined sequence, and means for transmitting said pulse groups in interleaved time division multiplex relation over a single signal channel, and a receiving station comprising a second series of $n$ multivibrators similarly synchronized from each other in cascade, means for receiving said transmitted pulse groups and utilizing them to synchronize said second series with said first series, a demodulator supplied with said received pulse groups, a gate device controlled by one of said second series of multivibrators to render said demodulator responsive only to a corresponding received pulse group, and a second program controller synchronized with said first controller for transposing the control of said gate device between multivibrators of said second series in the same irregular predetermined sequence as at said transmitting station.

12. In a secrecy communication system, a transmitting station comprising a first series of pulse generators synchronized from each other in cascade relation, each generator producing a group of recurrent pulses interleaved with pulses from the other generators in time division multiplex relation, means for modulating one of said pulse groups with a desired signal and the remaining groups with different signals, program control means for transposing said signals among said pulse groups in an irregular predetermined time sequence, and means for transmitting all said pulse groups over a single signal channel, a receiving station comprising a second corresponding series of pulse generators similarly synchronized from each other in cascade, means for receiving said transmitted pulse groups and utilizing them to synchronize said second series with said first series, a demodulator supplied with said received pulse groups, gating means controlled by one of said second series of pulse generators to render said demodulator responsive only to a corresponding pulse group, and second program control means for synchronously switching control of said gating means between generators of said second series in the same irregular predetermined sequence as at said transmitting station, and additional means at each of said stations for synchronously and intermittently removing one of said pulse generators from each of said series, thereby to vary the pulse repetition rate.

13. A secrecy communication system comprising means for supplying a desired intelligence-bearing signal wave, means for generating a train of recurrent pulses, means for frequency-modulating the repetition frequency of said pulses as a function of the amplitude of said signal wave thereby to provide a masking wave, and means for sampling and transmitting portions of said desired wave and of said masking wave in prearranged time division multiplex sequence.

14. A secrecy communication system comprising means for supplying a desired intelligence-bearing wave having frequencies within a predetermined frequency band, two pulse generators each operating at a mean pulse repetition frequency corresponding to a relatively high frequency within said band, means for concurrently modulating the pulse repetition frequencies of said two generators in opposite senses in accordance with the amplitude of said desired wave thereby to provide two oppositely-modulated pulse masking waves, and means for sampling and transmitting portions of said three waves in programmed time division multiplex sequence.

15. A secrecy communication transmitting system comprising, in combination, a source of desired intelligence-bearing signals extending over a band of signal frequencies, a plurality of sources of masking signals, each source comprising a pulse generator operating at a relatively high mean frequency within said band and means for frequency-modulating the pulse repetition frequency of each of said generators as a function of the amplitude of said desired signals, and means for sampling and transmitting portions of said desired signals and of each of said masking signals in time division multiplex relation and pre-arranged program sequence.

References Cited in the file of this patent

UNITED STATES PATENTS

| | | |
|---|---|---|
| 725,636 | Stone | Apr. 14, 1903 |
| 1,461,783 | Parker et al. | July 17, 1923 |
| 1,526,335 | Griggs | Feb. 17, 1925 |
| 1,561,273 | Nichols | Nov. 10, 1925 |
| 1,598,673 | Blackwell et al. | Sept. 7, 1926 |
| 1,613,686 | Vernam | Jan. 11, 1927 |
| 1,709,901 | Espenschied et al. | Apr. 23, 1929 |
| 1,802,745 | Whitaker | Apr. 28, 1931 |
| 1,869,659 | Broertjes | Aug. 2, 1932 |
| 1,976,393 | Hammond | Oct. 9, 1934 |
| 2,101,224 | Osborne et al. | Dec. 7, 1937 |
| 2,107,756 | Kendall et al. | Feb. 8, 1938 |
| 2,199,634 | Koch | May 7, 1940 |
| 2,213,320 | Mathesetal | Sept. 3, 1940 |
| 2,262,838 | Deloraine et al. | Nov. 18, 1941 |
| 2,312,897 | Guanella et al. | Mar. 2, 1943 |
| 2,326,515 | Bartelink | Aug. 10, 1943 |
| 2,352,634 | Hull | July 4, 1944 |
| 2,405,252 | Goldsmith | Aug. 6, 1946 |
| 2,406,851 | Levy | Sept. 3, 1946 |
| 2,412,964 | Chatterjea et al. | Dec. 24, 1946 |
| 2,429,608 | Chatterjea et al. | Oct. 28, 1947 |

FOREIGN PATENTS

| | | |
|---|---|---|
| 541,665 | Great Britain | Dec. 5, 1941 |
| 558,343 | Great Britain | Dec. 31, 1943 |